(No Model.)
J. P. KING.
CULINARY VESSEL.
No. 378,690. Patented Feb. 28, 1888.
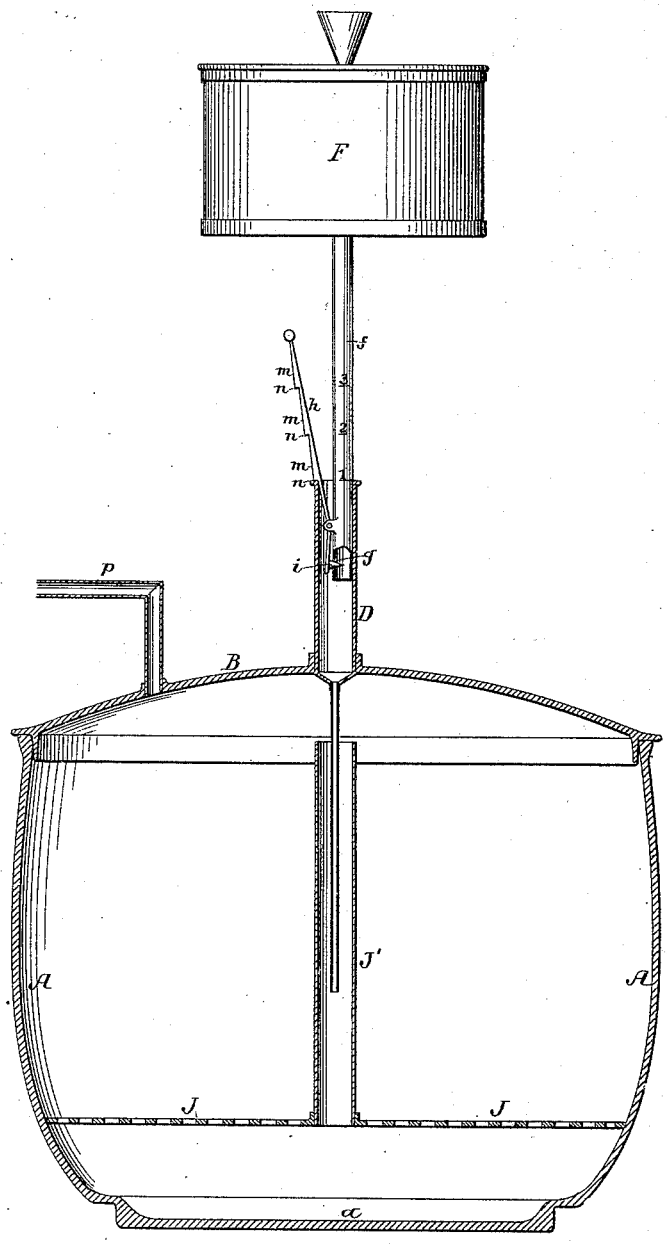
Witnesses:
Hey. Barkoff
David L. Williams.
Inventor:
John P. King.
by his Attorneys.
Howson & Sons.

UNITED STATES PATENT OFFICE.

JOHN P. KING, OF PHILADELPHIA, PENNSYLVANIA.

CULINARY VESSEL.

SPECIFICATION forming part of Letters Patent No. 378,690, dated February 28, 1888.

Application filed January 6, 1887. Serial No. 223,563. (No model.)

*To all whom it may concern:*

Be it known that I, JOHN P. KING, a citizen of the United States, residing in Philadelphia, Pennsylvania, have invented certain Improvements in Culinary Vessels, of which the following is a specification.

The object of my invention is to so construct a culinary vessel that the operation of cooking or heating may be effected more expeditiously than usual, and this object I attain in the manner hereinafter set forth, reference being had to the accompanying drawing, which represents in vertical section a culinary vessel constructed in accordance with my invention.

The body A of the vessel may be of any desired shape, and may have either a flat bottom or a projecting bottom, $a$, for adaptation to the opening of a stove or range.

The vessel A is made with a close-fitting but detachable lid, B, and secured to the latter is a pipe, D, the upper portion of which is preferably flared or funnel-shaped, the portion within the vessel being contracted in diameter, or having a contracted discharge-opening the area of which is such that the water can enter the vessel only in limited volume, so that when the vessel is set upon the stove the small quantity of water which flows onto the bottom of the same can be vaporized at once and the contents of the vessel immediately subjected to the cooking action of the steam thereby generated, the limited volume of the continuing supply being likewise vaporized almost as soon as it enters the vessel, so as to keep up the supply of steam for cooking purposes. By this means the cooking operation may be commenced almost as soon as the vessel is placed upon the stove, whereas in the ordinary cooking-vessel more or less time necessarily elapses before the large body of water contained in the vessel is sufficiently heated to generate steam. This is of especial advantage where the stove is one using gas or oil as a fuel, as it is an object in such cases to generate steam with as little delay as possible in order to prevent waste of fuel.

The pipe D may be of sufficient dimensions to contain a supply of water sufficient for the cooking operation or the supply in the pipe may be renewed, at intervals, as may be necessary; but I prefer to use in connection with the vessel a reservoir which will furnish the proper supply of water to the pipe D during the time that the vessel is in use.

The reservoir shown in the drawing consists of a simple vessel, F, of the desired capacity, having a downwardly-projecting stem, $f$, adapted to enter the pipe D. In this stem $f$ is a lateral opening, $g$, to which is adapted a valve, $i$, carried by a lever, $h$, hung to a suitable bearing on the side of the stem. The upper arm of this lever forms a series of inclined planes, $m$, terminating in shoulders $n$, and as the stem $f$ is thrust into the pipe D the lowest of these inclined planes, by contact with the upper edge of the pipe, causes such an operation of the lever $h$ as to partially open the valve $i$ and permit a flow of water from the reservoir into the pipe and from the latter into the vessel A. If a freer flow of water is desired, the lever $h$ may be depressed and the stem $f$ thrust into the pipe D until the movement is arrested by contact of a higher shoulder $n$ with the top of the pipe, the valve being thereby further opened and a freer flow of water permitted; or in some cases the pipe D may be dispensed with and the stem $f$ of the reservoir simply thrust through an opening in the lid of the vessel, the lever $h$ being operated by contact with the edge of said opening, as before set forth; or other forms of valve may be used for controlling the discharge from the reservoir, so that the area of the discharge-opening in the stem may be varied to accord with the vaporizing capacity of the vessel due to the area of its heating-surface and the degree of heat to which it is being subjected.

The vessel has a perforated plate, J, supported at some little distance above the bottom and provided with a central tube, J', this plate serving to support the contents of the vessel and the tube preventing the water from coming in contact with said contents as it is discharged from the pipe D.

If a surplus of steam is being generated, it may be conveyed from the vessel A to any adjacent cooking or heating vessel, the lid B being provided with a pipe, $p$, for receiving a flexible tube or other conductor for this purpose.

If the vessel A is of cast-iron, care should be taken to supply the same in the first instance with a small quantity of water, in order to prevent the vessel from becoming so highly heated when placed upon the stove as to incur any risk of cracking by reason of the cold water from the supply-pipe coming directly in contact with the heated bottom of the vessel.

I am aware that it has been proposed to mount at one side of a cooking-vessel an airtight reservoir communicating through a horizontal pipe with the lower portion of said vessel, the flow from the reservoir to the vessel being cut off when the mouth of said pipe was sealed by the rise of the water in the vessel to a point above said mouth; but in this case the reservoir is close to the stove, and the water in the same is liable to be vaporized by the heat. Moreover, the horizontal pipe, in order to provide for the passage of the water, must be of such large area that a considerable volume of water enters the vessel in the first instance, so that steam is not generated quickly. Both of these objections are overcome by my invention, for the water-reservoir on the lid is not subjected to such heat as to cause vaporization of its contents, and the pipe D may be carried down as close to the bottom of the vessel as desired, so as to prevent even accidental flooding of said vessel.

I therefore claim as my invention and desire to secure by Letters Patent—

1. The combination of the vessel and its lid, the water-reservoir carried by the lid, an elevated support for the vessel, and a tube or conduit whereby water is conveyed from the reservoir on the lid to a point beneath said elevated support, the area of the opening for the discharge of the water being contracted, so that the water enters the vessel in limited volume, all substantially as specified.

2. The combination of the vessel, the water-reservoir having a stem with a discharge-opening, a valve adapted to said discharge-opening, a valve-lever having an arm forming a series of inclined planes, and the lid of the vessel having a pipe or passage for the reception of said stem and its valve-lever, whereby the vertical adjustment of the reservoir in respect to the vessel governs the rate of flow of the water from said reservoir into the vessel, all substantially as specified.

3. The combination of the vessel and its lid, with the independent reservoir having a stem with discharge-opening, a valve adapted to said opening, and a valve-lever having a series of inclined planes with intervening shoulders, all substantially as specified.

4. The combination of the vessel, the lid having a water-reservoir, a perforated plate supported above the bottom of the vessel, a discharge-stem for directing the water from the reservoir on the lid to the bottom of the vessel, and a tube inclosing the mouth of said discharge-stem, all substantially as specified.

In testimony whereof I have signed my name to this specification in the presence of two subscribing witnesses.

JOHN P. KING.

Witnesses:
WILLIAM D. CONNER,
HARRY SMITH.

Correction in Letters Patent No. 378,690.

It is hereby certified that in Letters Patent No. 378,690, granted February 28, 1888, upon the application of John P. King, of Philadelphia, Pennsylvania, for an improvement in "Culinary Vessels," an error appears in the printed specification requiring correction, as follows: In line 33, page 2, the words "*contents of the*" should be inserted before the word "vessel"; and that the Letters Patent should be read with this correction therein to make it conform to the record of the case in the Patent Office.

Signed, countersigned, and sealed this 20th day of March, A. D. 1888.

[SEAL.]

D. L. HAWKINS,
*Assistant Secretary of the Interior.*

Countersigned:
BENTON J. HALL,
*Commissioner of Patents.*